C. B. STILWELL.
FAULT DETECTING AND CORRECTIVE APPARATUS FOR PAPER WORKING MACHINERY.
APPLICATION FILED APR. 23, 1907.
955,221.
Patented Apr. 19, 1910.
6 SHEETS—SHEET 1.
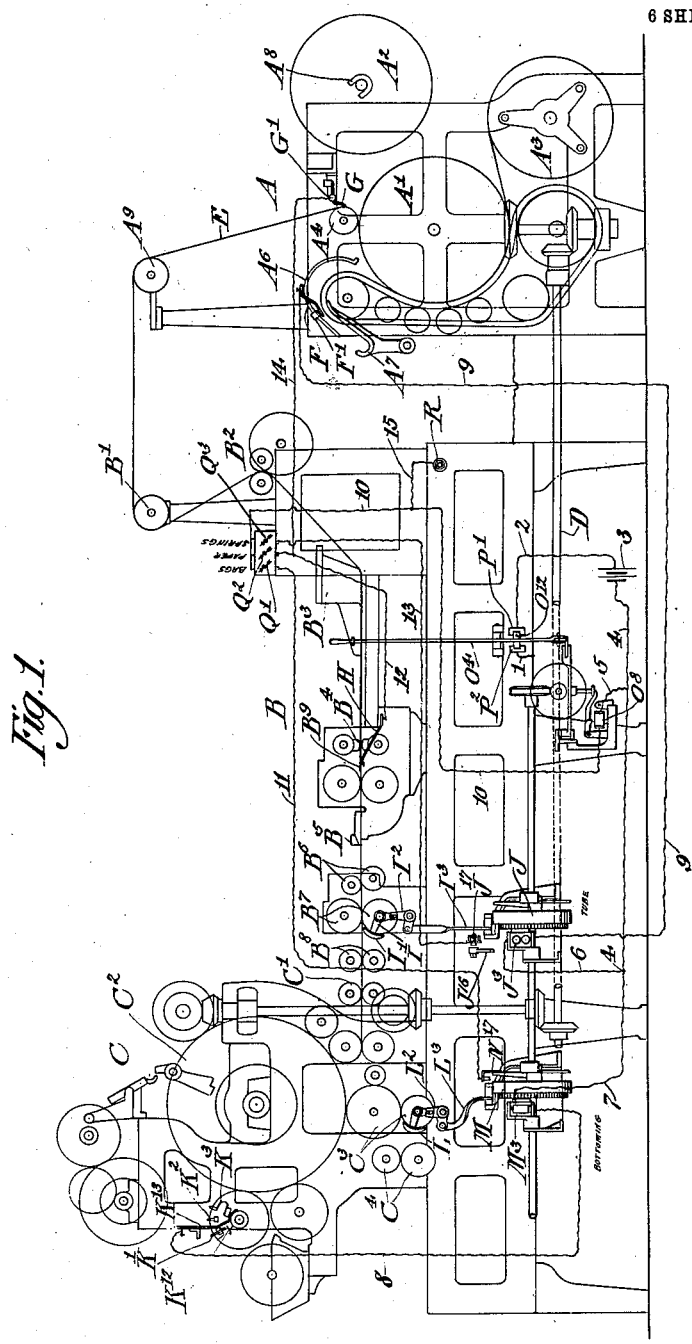
WITNESSES:
INVENTOR
Charles B. Stilwell
BY
Francis J. Chambers
ATTORNEY.

C. B. STILWELL.
FAULT DETECTING AND CORRECTIVE APPARATUS FOR PAPER WORKING MACHINERY.
APPLICATION FILED APR. 23, 1907.
955,221.
Patented Apr. 19, 1910.
6 SHEETS—SHEET 2.
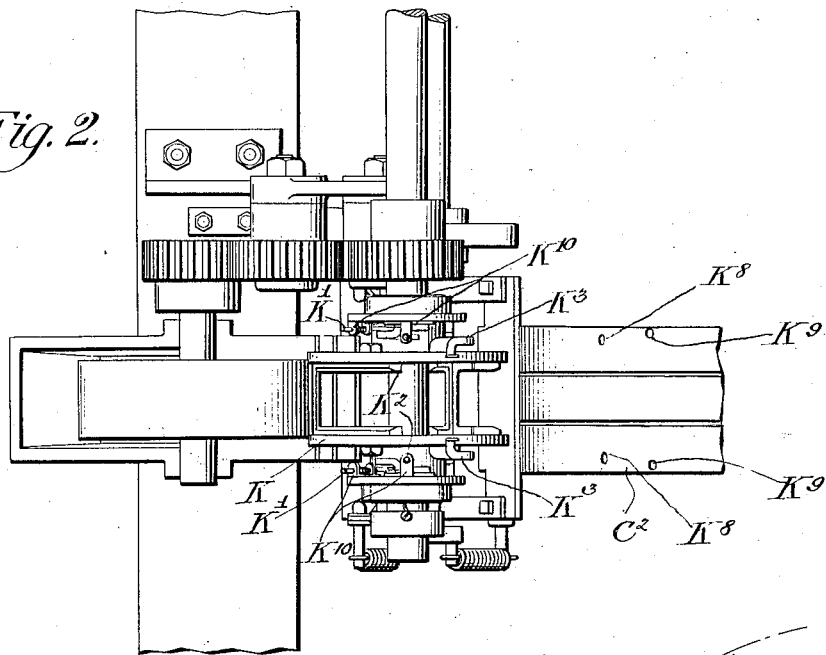
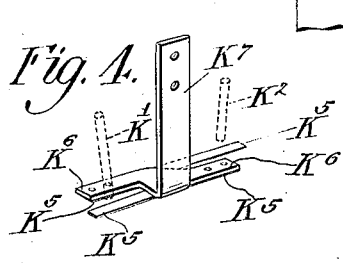
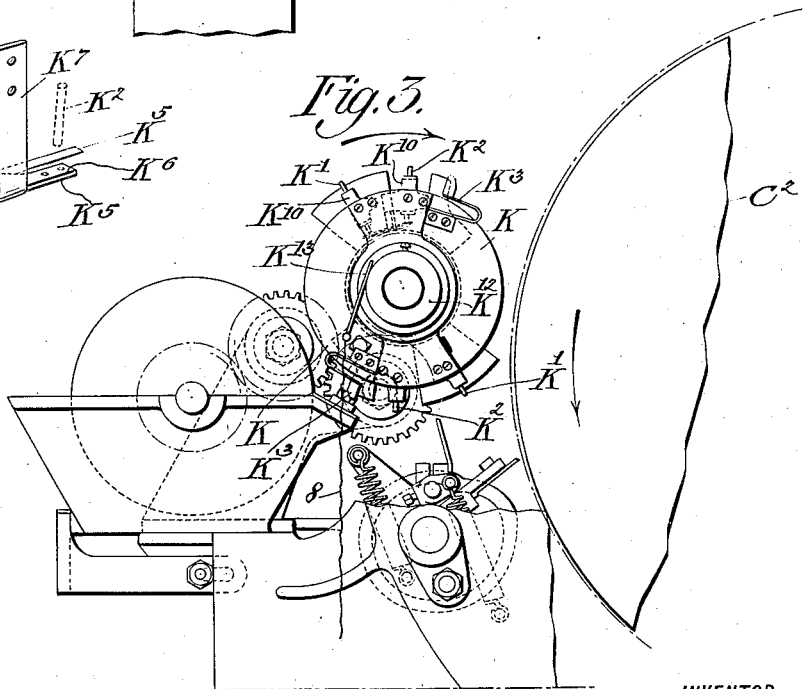

C. B. STILWELL.
FAULT DETECTING AND CORRECTIVE APPARATUS FOR PAPER WORKING MACHINERY.
APPLICATION FILED APR. 23, 1907.
955,221.
Patented Apr. 19, 1910.
6 SHEETS—SHEET 3.
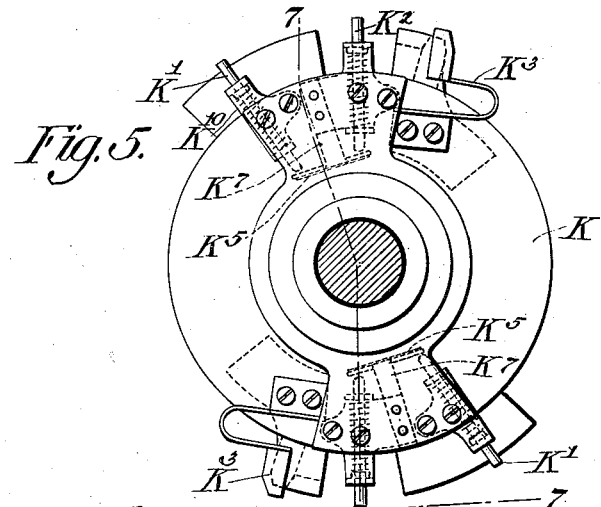
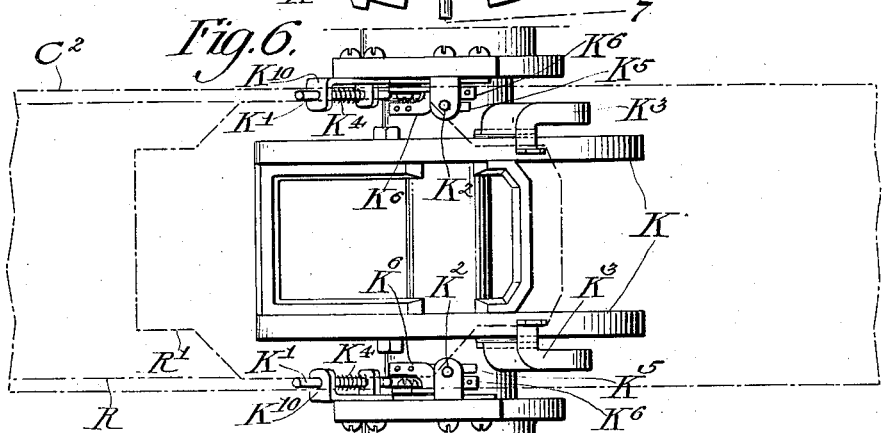
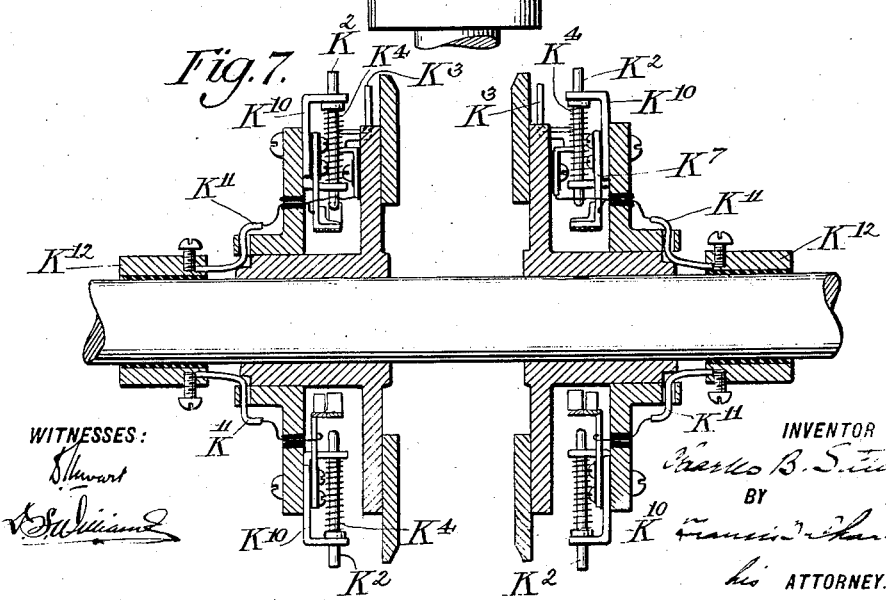

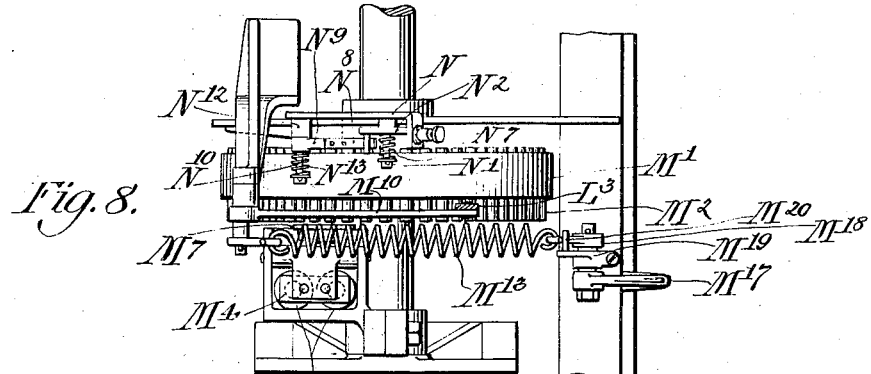

C. B. STILWELL.
FAULT DETECTING AND CORRECTIVE APPARATUS FOR PAPER WORKING MACHINERY.
APPLICATION FILED APR. 23, 1907.
955,221.
Patented Apr. 19, 1910.
6 SHEETS—SHEET 5.
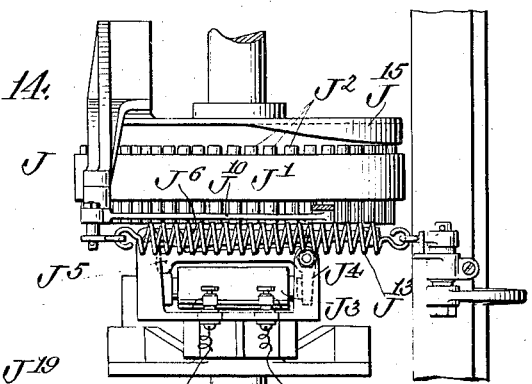
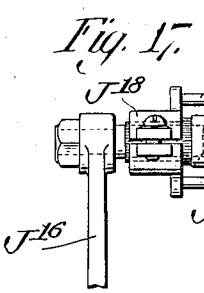
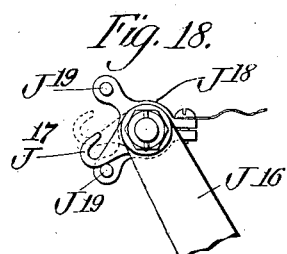
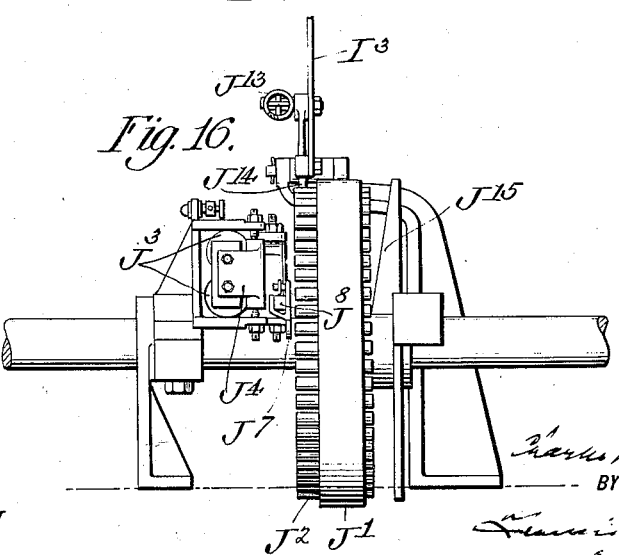
WITNESSES:
INVENTOR
BY
ATTORNEY.

C. B. STILWELL.
FAULT DETECTING AND CORRECTIVE APPARATUS FOR PAPER WORKING MACHINERY.
APPLICATION FILED APR. 23, 1907.
955,221.
Patented Apr. 19, 1910.
6 SHEETS—SHEET 6.
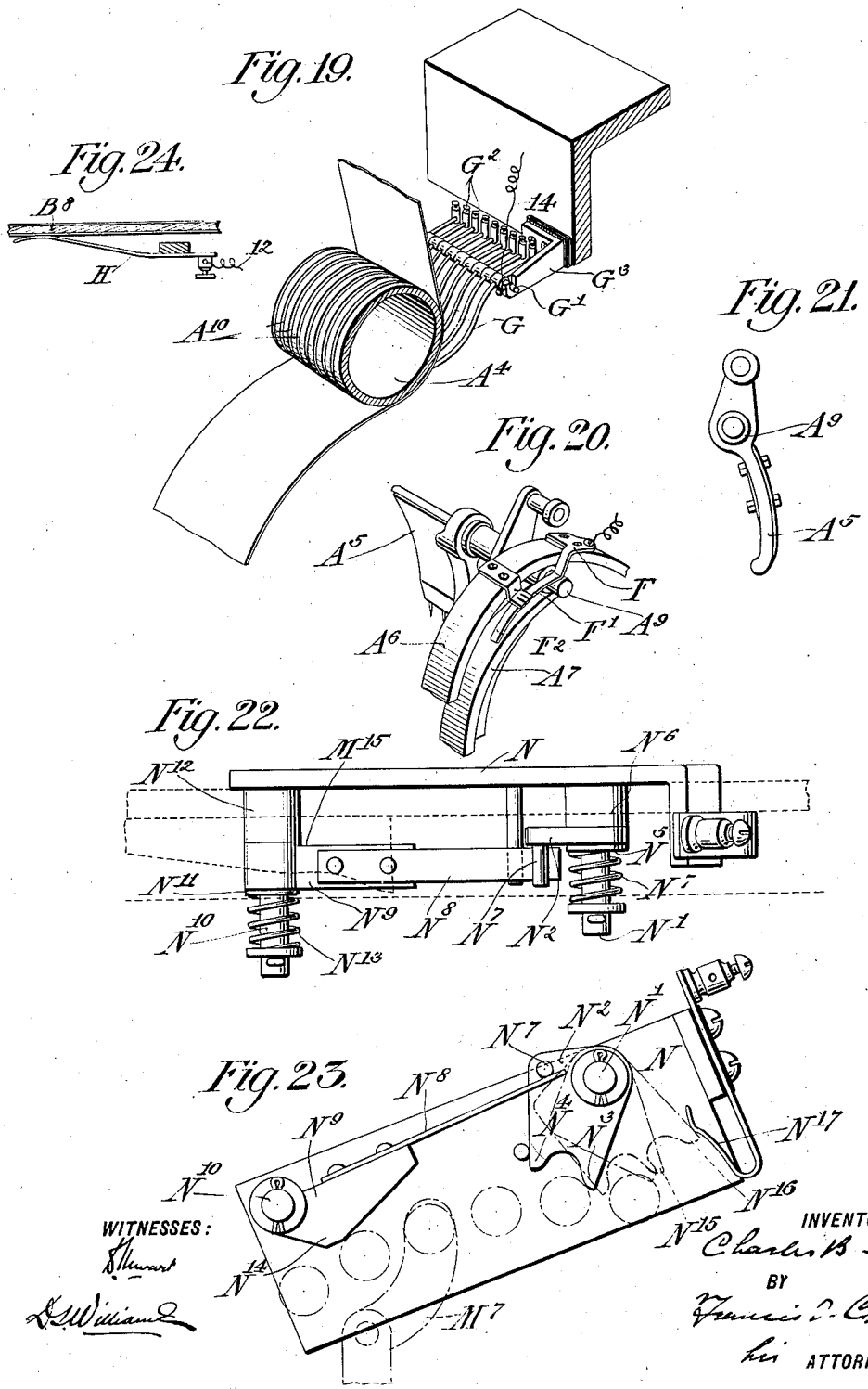

UNITED STATES PATENT OFFICE.

CHARLES B. STILWELL, OF WAYNE, PENNSYLVANIA, ASSIGNOR TO UNION PAPER BAG MACHINE COMPANY, OF PHILADELPHIA, PENNSYLVANIA, A CORPORATION OF PENNSYLVANIA.

FAULT-DETECTING AND CORRECTIVE APPARATUS FOR PAPER-WORKING MACHINERY.

955,221. Specification of Letters Patent. Patented Apr. 19, 1910.

Application filed April 23, 1907. Serial No. 369,751.

*To all whom it may concern:*

Be it known that I, CHARLES B. STILWELL, a citizen of the United States of America, residing in Wayne, in the county of Delaware and State of Pennsylvania, have invented a certain new and useful Improvement in Fault-Detecting and Corrective Apparatus for Paper-Working Machinery, of which the following is a true and exact description, reference being had to the accompanying drawings, which form a part thereof.

My present invention comprises means for automatically detecting faults in the operation of machines such as paper working machines, and corrective mechanism arranged to be set in operation by the detecting means on the detection of faults.

The invention is primarily intended for use in connection with automatic machinery for continuously advancing a web of paper, and having means for securing a following web to a preceding web when necessary without stopping the machinery, converting the web into a continuous tube, severing the tube into lengths and converting the tubes into bags.

As so used, the invention comprises means for detecting faults in the web of paper or its feed, faults in the tube and faults in the formation of the bags produced.

It also includes means for stopping the machinery upon the detection of faults in the web or its feed, a breakage of the machine or faults in the bag formations occurring with a frequency greater than is permissible. An important feature of my invention is found in the provision of means for throwing out an occasional bad bag without stopping the machinery and for stopping the machinery whenever the faulty bags detected are numerous enough to exceed a permissible wastage and to necessitate a stoppage of the machine for repairs or adjustment.

Another important feature of my invention is the provision of a timing mechanism by which a throw-out mechanism is operated by the fault detecting apparatus, but after an interval in the operation of the mechanism permitting the defective material to be transported from the point where the fault is detected to a convenient point for its ejection from the machine. Such a timing device is particularly advantageous in connection with that important part of my invention in which I provide means for throwing out the portion of the material worked upon containing the joint between two webs. I have arranged so that this material is thrown out after the tube is formed and severed into lengths, thus obviating any necessity for special severing mechanism and also avoiding the necessity for threading the paper through the tube forming dies which would exist if the joint containing material were thrown out prior to the formation of the tube. At the same time I avoid feeding this joint containing material through the bag forming mechanism proper where it might injure the folding devices or disturb their adjustment.

My invention also comprises means for detecting breaks in certain of the machinery parts, especially liable to injury.

The invention also comprises numerous novel features of construction and arrangement.

While the features of invention disclosed herein are primarily intended for conjoint use in machinery for forming paper bags, my invention in some of its aspects is capable of a much wider range of use and some features may well be used when desired without a corresponding use of other features.

In the claims annexed to this specification, I have aimed to specifically point out all the novel features which characterize my invention, but for a better understanding of my invention, reference may be had to the accompanying drawings and descriptive matter in which I have illustrated and described one embodiment of my invention.

In the drawings, Figure 1 is a diagrammatic view of apparatus embodying my invention. Fig. 2 is a plan view of a portion of a bag bottoming machine having applied to it bag formation testers. Fig. 3 is an elevation of the mechanism shown in Fig 2. Fig. 4 is a perspective view of a portion of bag formation contact mechanism. Fig. 5 is an elevation on a larger scale than Fig. 3 of a portion of the mechanism shown therein. Fig. 6 is a plan view of the structure shown in Fig. 5, with a portion of the folding bed and a diamond folded blank shown in dotted lines. Fig. 7 is a sectional elevation taken on the line 7—7 of Fig. 5. Fig. 8 is a plan view of the timing device and appurtenant parts used in conjunction with the bag forming mechanism. Fig. 9 is a side elevation of the mechanism of Fig. 8. Fig. 10 is an end elevation of the mechanism of Figs. 8 and 9. Fig. 11 is a side elevation of the mechanism for operating the main power controlling clutch. Fig. 12 is a side elevation of the mechanism shown in Fig. 11. Fig. 13 is a semidiagrammatic plan view of the clutch operating connections with the clutch released. Fig. 14 is a plan view of the timing device and appurtenant parts used in connection with the throw out of the tubes containing the web joints. Fig. 15 is a side elevation of the mechanism shown in Fig. 13. Fig. 16 is an elevation taken at right angles to Fig. 14. Fig. 17 is an elevation showing the means for detecting a broken spring. Fig. 18 is an elevation taken at right angles to Fig. 17. Fig. 19 is a perspective view of the web tester. Fig. 20 is a perspective view of the contact actuated by the web attaching stick of the paper feed mechanism. Fig. 21 is an elevation of the web attaching stick. Fig. 22 is a plan view on a larger scale than Fig. 8 of a portion of the mechanism shown in Fig. 8, and Fig. 23 is an elevation of the mechanism shown in Fig. 22. Fig. 24 is a sectional elevation of the means for detecting faults in the tube.

Referring first to Fig. 1 of the drawings, A represents the paper feeding mechanism, B the tube forming mechanism, and C the bag bottoming mechanism. In the form shown, the tube forming and bag bottoming mechanisms are mounted on a common framework or base. These three principal parts of the mechanism disclosed are driven from a main countershaft D, which in turn is driven from a shaft $D^1$ through gears as shown in Fig. 13.

The general operation of the mechanism is as follows: The web E of paper is drawn by the paper feed mechanism around the cylinder $A^1$ from the roll $A^2$ or $A^3$ passing away from the cylinder $A^1$ over the roll $A^4$. Normally the paper is drawn from the roll $A^2$, but when the paper upon the roll $A^2$ is nearly exhausted, the roll $A^3$ is brought up to speed and the outer end of the web forming the roll is cemented onto the paper passing away from the roll $A^2$, which at the same time is severed from the residue of the web in the roll $A^2$. The means for cementing the end of the paper forming the roll $A^3$ onto the paper which is passing off the roll $A^2$, comprises a movable member or stick $A^5$, see Fig. 20, which is carried by suitable mechanism part way around the cylinder $A^1$ and is then engaged by the guides $A^6$ and $A^7$ and separated from the paper. The roll $A^2$ is then removed from the bearings $A^8$ and the roll $A^3$ is substituted so that the continuous web of paper is continuously drawn over the roll $A^1$ at high speed. As the exact construction of the paper feed mechanism described forms no part of the present invention, but on the contrary may be that of my Patent 808,883, granted January 21, 1906, no need is seen for any more detailed description herein of this mechanism. From the roll A, the paper passes over the bridge rolls $A^9$ and $B^1$ to the tube forming mechanism, the paper being printed and having paste applied to it at or adjacent the roll $B^2$. It is then converted into a bellows sided tube by the plow or former $B^3$ and coöperating parts. The tube may have certain longitudinal cuts formed in it at $B^4$ and is separated into bag lengths at $B^5$. Rolls $B^6$ $B^7$ and $B^8$ carry the bag blanks to the feed rolls $C^1$ of the bottoming machine from which the blanks pass to the bottom forming cylinder $C^2$. The various operations of forming first the diamond folds and then the flap folds incident to the formation of a square bottomed bellows sided bag are carried out on the cylinder $C^2$. As the exact construction of the tube forming and bag bottoming mechanism form no part of my present invention, no further general description of this mechanism is thought necessary, especially as the tube forming mechanism so far as is herein described is of a type well known in the art and the bottoming mechanism disclosed forms the subject of my prior application for a patent, Serial Number 354,008, filed January 25th, 1907.

I will now pass to a description of the paper and bag testing mechanism and coöperative corrective mechanism describing first the parts appurtenant to the paper feed mechanism.

The guide $A^6$ has attached to it two contacts F and $F^1$, (see Fig. 20.) The contact $F^1$ is rigid and is electrically connected to the framework of the machine. The contact F is insulated from the framework and has a spring finger $F^2$ normally standing away from the contact F, but pressed into engagement with the contact $F^1$ by an arm $A^9$ carried by the stick $A^5$ as the latter passes into engagement with the guides $A^6$ and $A^7$. As a result, the contacts F and $F^1$ are connected whenever and only when a joint is formed in the web E by lapping the outer end of the web from the roll $A^3$ onto the paper which has passed off of the roll $A^2$. The purpose of the contacts F and $F^1$ as will be more fully pointed out later, is to cause the ejection from the machine of the portion of the web which is defective because of the two thicknesses at the joint.

As shown best in Fig. 19, the roll $A^4$ is provided with a series of circumferentially extending grooves $A^{10}$. At one side of the roll $A^4$ is located a series of pivoted fingers G pivoted on a shaft $G^1$ each extending in the plane of a corresponding groove $A^{10}$. Each finger G is provided with a counterweight $G^2$ tending to move the finger into the corresponding groove $A^{10}$. Normally the fingers are held out of the grooves by the presence of the web E of paper between the roll and the fingers. As shown, the brackets $G^3$ which support the shaft $G^2$ are insulated from the framework of the machine A on which they are mounted. When the web of paper has holes in it or is less than the proper width or is laterally displaced from its proper position on the roll $A^4$, the fingers, or some of them contact the roll $A^4$ and thus connect the shaft $G^2$ electrically to the framework. When a hole passes under a finger G the finger is drawn through the paper in the proper groove $G^{10}$, the grooves thus make the action of the fingers more positive.

In the formation of the tube, a portion of the web passes under a metal guide-bar $B^8$ secured to and forming an extension of the plow $B^3$. Spring fingers H insulated from the framework of the mechanism tend to press against the bar $B^9$ being normally held out of engagement therewith by the paper. Should the tube break or the tube have holes in its under side undetected by the fingers G or occurring after the paper has passed by the fingers G, such fault will be detected by the fingers H, moving into electrical contact with the bar $B^9$.

A switch or shunting device I is carried by arms $I^1$ located at each end of the lower roll $B^7$ and journaled on the shaft supporting the roll. One of the arms $I^1$ is joined to one arm of a bell-crank lever $I^2$ to the other arm of which is connected a link $I^3$. When the link $I^3$ is pulled down, the switch I is moved from the position shown in Fig. 1, in which it permits the bag blanks to pass to the bottoming mechanism into the position in which it deflects the bag blanks downward along the lower roll $B^7$, thus diverting them from the bottoming mechanism. The switch I is controlled by the timing device J, see Figs. 14, 15, and 16, which includes a rotating disk or cylinder $J^1$ which is driven at the desired speed from the shaft D. The disk has formed in it adjacent its periphery a number of axially extending pockets or passages in which are located sliding pins $J^2$ which normally project from the ends of the cylinder J, as shown in Figs. 14 and 15. At one side of the disk J is located an electromagnet $J^3$, the movable armature $J^4$ of which has an arm $J^5$ adapted to engage and move a pivoted arm $J^6$ to force a striker finger $J^7$ carried by it into engagement with the pin $J^2$ then in front of it when the armature is energized. The pin engaged by the finger $J^7$ when the magnet $J^3$ is energized, is moved axially in its passage in the disk J. As shown, the finger $J^7$ is pivoted to the arm $J^6$, so that it may yield when engaged by a pin or pins $J^2$ above the one which it has displaced in the disk. A spring $J^9$ normally holds the finger in the operative position. The lower end of the link $I^3$ is pivotally connected to one arm $J^{10}$ of a bell-crank lever pivoted to the framework of the machine at $J^{11}$. The other arm $J^{12}$ of the bell-crank lever is acted upon by a spring $J^{13}$ tending to move the link $I^3$ in the direction to divert blanks away from the bottoming mechanism. This movement is normally prevented by a lug $J^{14}$ carried by the lever $J^{10}$ and riding on the outer surfaces of the adjacent projecting ends of the pins $J^2$. When a pin, axially displaced by the finger $J^7$ travels around to the position beneath the lug $J^{14}$, the arm $J^{10}$ drops and the deflector I is raised and a blank is diverted from the bottoming mechanism. A cam $J^{15}$, acts to return any displaced pins to the normal position as they travel away from the position where they engage the lug $J^{14}$. The energization of the magnet $J^3$ is controlled by the contacts F and $F^1$ and the parts are so timed that the bag blank containing the lap or joint is thrown out by the deflector I when it reaches the rolls $B^7$.

The bag formation testers are in the form shown applied to the revolving device K, employed for applying paste to the bottom of the bag after it has been diamond folded, and preparatory to the flap folding. These detectors comprise sliding fingers or pins $K^1$ and $K^2$ and resilient fingers $K^3$. The sliding fingers $K^1$ and $K^2$ are all radial and are normally held by springs $K^4$ so that their inner ends are out of engagement with the spring contact fingers $K^5$ secured to arms $K^6$ of a bracket $K^7$, secured to but insulated from the framework of the member K. It should be explained that in the form shown the member K is provided with two sets of pasting devices and detectors, each set working alternately. The outer ends of the pins $K^1$ and $K^2$ normally enter depressions $K^8$ and $K^9$, respectively, (see Fig. 2) formed for the purpose in the cylinder $C^2$ at the margins $R^1$ of the diamond folded blank R (see Fig. 6), when it is properly formed and consequently the diamond fold lines are properly positioned on the folding cylinder. Any fault in the formation of the diamond folds resulting in a portion of the paper being extended over one or more of the depressions $K^8$ and $K^9$ in the folding cylinder causes the corresponding pin or pins $K^1$ or $K^2$ to be pressed laterally inward and engage the corresponding spring contact or contacts $K^5$. The spring fingers $K^3$ are so positioned that they normally engage the extreme forward end of the folded blank, but if this is back of the proper position they engage the folding cylinder and make electrical contact therewith. The pins $K^1$ and $K^2$ are electrically connected to the framework of the machine by means of the brackets $K^{10}$, in which they are supported. The fingers $K^3$ are insulated from the framework K. The fingers $K^3$ and contact supporting brackets $K^7$ are connected by conductors $K^{11}$, insulated from the framework of the machine, to slip-rings $K^{12}$ secured on, but insulated from, the shaft which carries the pasting mechanism K.

In normal operation, the bags formed on the folding cylinders $C^2$ are delivered to the receiving mechanism formed by the rolls $C^3$ and $C^4$. In coöperative relation to the lower roll $C^3$ is located a shunting device or switch L, which may be similar to the switch I, and be operated in a similar manner through a lever $L^2$ by the link $L^3$ connected to a timing device M generally similar to the timing device J, but differing in some particulars. As shown, the timing mechanism M comprises parts $M^1$, $M^2$, $M^3$, $M^4$, $M^5$, $M^6$, $M^7$, $M^8$, $M^9$, $M^{10}$, $M^{11}$, $M^{12}$, $M^{13}$, $M^{14}$ and $M^{15}$, generally similar to the parts $J^1$ to $J^{15}$, respectively, although the magnet and parts connected with it are somewhat differently disposed. The operation of the device M is like that of the throw-out J in that whenever the magnet $M^3$ is energized and a pin $M^2$ laterally displaced, the deflector L is operated to divert a bag at the proper time from its usual course. The displaced pins in the throw-out M perform an additional function, however, which I will now describe.

On the opposite side of the disk $M^1$ from that to which the lever $M^{10}$ is arranged, is located a plate N, having a stud $N^1$ on which is journaled an arm $N^2$ having two pin engaging teeth $N^3$ and $N^4$. A washer $N^5$ bearing against the arm $N^4$ and pressing it against a boss $N^6$ concentric with the stud $N^1$ in conjunction with the spring $N^7$ forms a frictional clamp acting to hold the arm $N^2$ in any position in which it may be moved. The arm $N^2$ also carries a pin or stud $N^7$ adapted to be engaged by a finger $N^8$ carried by an arm $N^9$ mounted on and held against turning by means of a stud $N^{10}$, washer $N^{11}$, boss $N^{12}$ and spring $N^{13}$, similar to the parts $N^1$, $N^5$, $N^6$ and $N^7$ previously described. The arm $N^9$ has a lug $N^{14}$ adapted to be engaged by a displaced pin. The arms $N^2$ and $N^{14}$ are located at one side of the normal position of the pins $M^2$, but so that they will be engaged by pins which have been displaced by the striker $M^7$. The normal condition of the apparatus is shown in Fig. 23. A pin, laterally displaced by the tapper $M^7$ engages the tooth $M^3$ and swings the arm $N^2$ into the dotted position indicated at $N^{15}$ in Fig. 23, whereupon the pin passes out from under the tooth. In this position of the arm $N^2$ the tooth $N^4$ is in position to be engaged by a displaced pin, should another pin be displaced before the arm $N^2$ has been returned to its original position, such a second displaced pin engaging the tooth $N^4$ carries the arm over into the second dotted position indicated at $N^{16}$, in which position it engages with the insulated spring contact finger $N^{17}$ carried by the plate N, and the circuit thus closed stops the machine in a manner hereinafter explained. In case a second pin is not displaced until the pin which has carried the arm $N^2$ from the full-line position to the dotted line position $N^{15}$ has moved into engagement with the cam lug $N^{14}$ on the arm $N^9$, such engagement causes the arm $N^9$ to be returned into its original position from the dotted line position into which it has been carried by the pin $N^7$ on the arm $N^2$. The returning movement of the arm $N^9$ to its full line position of course carries the arm $N^2$ back to its full line position. It will be observed that an occasional bad bag will be thrown out by the mechanism described without stopping the machine, but the detection of a second bad bag while the pin displaced by a first bad bag is traveling from the point at which it reaches a tooth $N^3$ to the position in which it engages the lug $N^{14}$ will stop the machine, and of course the maximum percentage of bad bags in a predetermined number of successively formed bags which may be allowed to pass without stopping the machine may be varied by changing the number of pins $M^2$ and the location of the arms $N^2$ and $N^9$.

The mechanism shown for stopping the machine includes a clutch O for connecting the shaft $D^1$ to its driver, which may be a belt-driven pulley or the like. The clutch is operated by a clutch lever $O^1$ pivotally connected to the framework of the machine at $O^2$ and at its other end to an operating bar $O^3$. As clutch mechanisms of this character are well-known, I have not thought it necessary to illustrate the exact construction of the parts and will only describe the operating features peculiar to my invention. The operating bar is connected at one end to an operating hand lever $O^4$ for manual actuation. It also has connected to it a lever $O^5$ pivoted to the framework of the machine at $O^6$. The lever $O^5$ has formed in it a bearing for a sliding pin $O^7$, which is located below and normally out of engagement with a screw cam $D^3$ secured to the shaft $D^1$. The electro-magnet $O^8$ has a pivoted armature $O^9$ provided with an extension $O^{10}$ which moves an arm $O^{11}$ and thereby lifts the pin $O^7$ into the position in which the upper end of the pin engages the screw cam $D^2$ whenever the magnet $O^8$ is energized. The engagement of the pin $O^7$ with the cam $D^3$ causes the lever $O^5$ to be turned on its pivot and move the operating bar $O^3$ to release the clutch and stop the machine. The lever $O^4$ carries a bridge contact $O^{12}$ which is adapted to connect contacts $P^1$ and $P^2$ when the clutch is in the operative position, and disconnect these contacts when the clutch is released.

The stationary arm $J^{16}$ to which one end of the spring $J^{13}$ is connected, has a spring engaging hook $J^{17}$ and an insulated bracket $J^{18}$ provided with pins $J^{19}$ located one above and one below the hook $J^{17}$ when the latter is in its normal position. These pins are engaged by the hook when it flies up or down on a breakage of the spring $J^{13}$. The hook $J^{17}$ is grounded to the framework of the machine and therefore when it engages either pin $J^{17}$ it establishes electrical connection between the framework of the machine and the insulated bracket $J^{18}$, and such a construction may be employed wherever the detection of a broken spring is desirable, as in the timing device M where the parts $M^{17}$, $M^{18}$, $M^{19}$ and $M^{20}$ correspond to the parts $I^{16}$, $I^{17}$, $I^{18}$ and $I^{19}$, respectively.

The electrical connections are as follows: A conductor 1 connects the contact $P^2$ to the machine framework. A conductor 2 runs from the contact $P^1$ to one side of the battery or other source of current 3. The other side of the source of current 3 is connected to a conductor 4, from which branches 5, 6 and 7 run to one terminal of each of the magnets $O^8$, $J^3$ and $M^3$ respectively. The second terminal of magnet $M^3$ is connected by a conductor 8 to the brushes $K^{13}$ engaging slip-rings $K^{12}$. The second terminal of magnet $J^3$ is connected by a conductor 9 to the contact F, of the feeding mechanism. A conductor 10 running from the second terminal of the stop magnet $O^8$ to one set of terminals of three electrical indicators $Q^1$, $Q^2$ and $Q^3$ mounted on a board Q. The winding of indicator $Q^1$ connects the conductor 10 and a conductor 11 running to the contact $N^{17}$ of the timing device M. The winding of the indicator $Q^2$ connects the conductor 10 and a conductor 12 connected to the pipe or tube contact fingers H. The winding of the third indicator $Q^3$ connects the conductor 10 and a conductor 13 running to the insulated spring engaging hook $J^{17}$ of the device J. It will be understood that in practice the conductor 13 is also connected to the insulated hook $M^{18}$ of the device M, though to avoid complicating the drawings this connection has not been shown in Fig. 1. A branch conductor 14 from the conductor 12 is connected to the web testing fingers G. A conductor 15 connects the conductor 10 to a push button R so that the operation of the latter will cause the magnet $O^8$ to be energized and thereby stop the machinery.

The general operation of my invention will be readily understood from the foregoing without any explanation, though attention is directed to the fact that an occasional fault in a bag detected by the bag formation testing devices results merely in an operation of the switch L, and a throwing out of the bad bag. A second bad bag produced in a predetermined number of bags following a first bad bag will result in the energization of the magnet $O^8$ and a stopping of the entire machinery. Furthermore, the indicator $Q^1$ will show that the stopping of the machinery was due to the improper operation of the bottoming machine. A breaking of the tube or fault therein, detected by the fingers H, or faults in the web of paper or its alinement on the roll $A^4$ detected by the fingers G will also stop the machine and the indicator $Q^2$ will show that fault was detected in the tube or web. It would, of course, be easy to provide a separate indicator for the fingers G and fingers H, but in actual practice I have not found such refinement necessary. A breakage of the springs $J^{13}$ or $M^{13}$ will also result in the stopping of the entire machinery, and the indicator $Q^3$ will show that the fault is in the springs and not in the paper feed, tube forming or bottoming mechanism.

While the forms of my invention disclosed herein have been found to give satisfactory results, it will be readily understood by those skilled in the art that my invention may be embodied in many different forms without departing from the spirit of my invention.

Having now described my invention, what I claim as new and desire to secure by Letters Patent is,

1. The combination in a bag machine, of bag folding mechanism, bag formation testers for detecting a badly formed bag, and corrective mechanism automatically actuated through said testers on the detection thereby of a badly formed bag.

2. The combination in a bag machine, of bag folding mechanism, bag formation testers for detecting a badly formed bag, corrective mechanism automatically actuated through said testers on the detection thereby of a badly formed bag, and means actuated by a breakdown of said mechanism for stopping the machine.

3. The combination in a bag machine, of bag folding mechanism, bag formation testers for detecting a badly formed bag, and mechanism automatically actuated through said testers on the detection thereby of a badly formed bag for throwing out such bag.

4. In a machine, automatic fault detecting means, corrective mechanism and means for actuating said mechanism after a predetermined interval following the detection of a fault by said detecting means, the actuating means including a wheel revolving in fixed relation to the speed of the machine, a series of pins movably supported thereby, means actuated by the fault detecting means for displacing a pin and means actuated by a displaced pin for operating the corrective mechanism.

5. In a paper working machine, means for detecting faults in the paper worked and mechanism for throwing out the defective paper after a predetermined interval following the detection of the fault, said mechanism comprising a rotating disk and a series of pins movably supported thereby, means actuated by the fault detecting means for displacing a pin upon the detection of a fault, and a shunting device actuated by a displaced pin for throwing out defective paper at the proper time.

6. In a bag forming machine, stop actuating mechanism including a movable member, means for detecting a fault in the formation of a bag, means actuated thereby upon the detection of a fault for moving said movable member from a normal position to an intermediate, but non-stop-actuating position, means for returning the member from the intermediate position to the normal position after the formation of a predetermined number of bags following the faulty bag without the detection of a faulty bag, and means for moving said member from the intermediate position to a second and stop actuating position upon the detection of faults in any of said predetermined number of bags.

7. In a bag machine, mechanism for successively diamond folding a blank, flap folding it and delivering it to receiving mechanism, means for detecting faults in the diamond folding and means actuated by the detecting means for diverting from the receiving means an improperly diamond folded blank after it has been acted upon by the flap folding mechanism.

8. In a bag machine, a folding bed, means for forming the diamond folds in a tubular bag blank supported on said folding bed and means for detecting faults in the folding operation comprising fingers arranged to be displaced by an improper location of the fold lines relative to the folding bed.

9. In a bag machine, a rotating folding bed, means for forming the diamond folds in a tubular bag blank supported on said bed, a device rotating above the bed detectors carried by said device and arranged to be displayed by an improper disposition of the diamond fold lines relative to said bed.

10. In a bag machine, a carrier for advancing a diamond folded blank and means for detecting an improper disposition of the diamond fold lines relative to the carrier.

11. In a bag machine, a carrier for advancing a diamond folded blank and means for detecting an improper disposition of the diamond fold lines relative to the carrier, said means including circuit closing devices actuated by improperly placed blank portions.

12. In a bag machine, a rotating folding cylinder, means for diamond folding a tubular bag blank thereon, a device rotating above the bed, and circuit closing mechanism carried by said device, comprising fingers rendered operative to close a circuit or circuits by an improper disposition of the blank on the cylinder.

13. In a bag machine, a rotating folding cylinder, mechanism for first diamond folding and then flap folding a bag blank on said cylinder, a revolving paster for applying paste to the blank after the formation of the diamond folds, and prior to the formation of the flap folds and means carried by the paster for detecting faults in the diamond folded blank.

14. In a paper working machine, mechanism for advancing a web of paper, a throw-out mechanism, and means automatically responsive to the passage through the machine of a jointed portion of said web for actuating said throw-out mechanism to throw out said jointed web portion.

15. In a paper working machine, means for advancing a web of paper, means for attaching a second web to the preceding web without stopping the machine, and means for thereafter automatically throwing out the portion of the paper containing the web joint.

16. In combination, mechanism for continuously advancing a web of paper, converting it into short tubes and delivering the tubes to a receiving mechanism, means for attaching a following web to a preceding web without stopping the operation of the first mentioned mechanism and means for diverting tubes containing web joints from the receiving mechanism.

17. In combination, mechanism for continuously advancing a web of paper, converting it into short tubes and delivering the tubes to a receiving mechanism, means for attaching a following web to a preceding web without stopping the operation of the first mentioned mechanism and means for diverting tubes containing web joints from the receiving mechanism, said means being set in operation automatically.

18. In combination, mechanism for continuously advancing a web of paper, converting it into short tubes and delivering the tubes to a receiving mechanism, means for attaching a following web to a preceding web without stopping the operation of the first mentioned mechanism and means for diverting tubes containing web joints from the receiving mechanism, said means comprising electrical devices energized by the operation of the web attaching mechanism.

19. A safety appliance for a machine having a tension spring comprising a pivotally supported hook to which one end of the spring is connected, and means for stopping the machine actuated by a displacement of the hook resulting from the breaking of the spring.

20. A safety appliance for a machine having a spring, comprising a movable support for the spring and means for stopping the machine responsive to the change of position of the movable support, resulting from a breakage of the spring attached to it.

21. In combination, a web feeding mechanism, mechanism for converting the web into a tube and severing it into lengths mechanism for converting the severed tubes into bags, means for stopping all of said mechanisms, means for automatically detecting faults in the web, means for automatically detecting faults in the tubes, means for automatically detecting faults in the bags formed and operative connections between each of said detecting means and the stopping means.

22. In a paper working machine, means for advancing a web of paper, converting it into a tube and forming bags from the tube, means for detecting faults in the bags formed, means for detecting faults in the paper prior to the formation of the bags, a common stop mechanism actuated by each of said detecting means, and indicators for showing which set of detecting means has actuated the stop mechanism.

23. In a paper working machine, means for continuously advancing the paper, means for detecting faults in the advancing paper at one point in the travel of the paper, a shunting device for faulty paper located at a later point in the travel of the paper and actuating means for the shunt set in operation by the detecting means on the detection of a fault, said actuating means including a timing device to delay the operation of the shunt until the faulty material has traveled from the point of detection to the point where the shunt is located.

CHARLES B. STILWELL.

Witnesses:
ARNOLD KATZ,
D. STEWART.